United States Patent [19]
Henderson et al.

[11] Patent Number: 5,272,692
[45] Date of Patent: Dec. 21, 1993

[54] DATA STORAGE MEMBER HAVING AREAS IN WHICH INTENSITY-MODULATED SIGNALS ARE OVERLAID WITH MAGNETO-OPTICALLY RECORDED SIGNALS

[75] Inventors: Ian E. Henderson; Morovat Tayefeh, both of Tucson, Ariz.

[73] Assignee: International Business Machines Corporation, Armonk, N.Y.

[21] Appl. No.: 896,897

[22] Filed: Jun. 10, 1992

Related U.S. Application Data

[60] Continuation of Ser. No. 707,215, May 24, 1991, abandoned, which is a division of Ser. No. 449,260, Dec. 11, 1989, Pat. No. 5,050,144.

[51] Int. Cl.$^5$ .............................................. G11B 11/00
[52] U.S. Cl. ................................ 369/275.1; 369/13; 369/275.4
[58] Field of Search ............... 369/275.1, 275.2, 275.3, 369/275.4, 275.5, 276, 13, 283; 360/77.03, 77.05, 77.06, 77.07, 77.08

[56] References Cited

U.S. PATENT DOCUMENTS

| | | | |
|---|---|---|---|
| 4,151,571 | 4/1979 | Cardot et al. | 360/77.08 |
| 4,297,737 | 10/1981 | Andresen et al. | 360/77.08 X |
| 4,402,061 | 8/1983 | Hazel et al. | 369/275.1 |
| 4,424,543 | 1/1984 | Lewis et al. | 360/135 |
| 4,486,870 | 12/1984 | Pettigrew et al. | 369/275.3 |
| 4,535,439 | 8/1985 | Satoh et al. | 369/275.3 |
| 4,594,622 | 6/1986 | Wallis | 360/77.05 |
| 4,636,855 | 1/1987 | Yamada | 360/78.14 |
| 4,669,003 | 5/1987 | Bell et al. | 360/77.05 |
| 4,669,004 | 5/1987 | Moon et al. | 360/77.08 |
| 4,730,289 | 3/1988 | Saitoh et al. | 369/13 |
| 4,736,352 | 4/1988 | Satoh et al. | 369/275.3 |
| 4,785,167 | 11/1988 | Madrid | 250/214 A |
| 4,814,903 | 3/1989 | Kulakowski et al. | 360/48 |
| 4,823,212 | 4/1989 | Knowles et al. | 360/77.08 |
| 4,905,215 | 2/1990 | Hattori et al. | 369/13 |
| 4,964,009 | 10/1990 | Moriya et al. | 360/77.07 X |
| 4,984,901 | 1/1991 | Maury | 360/135 |

*Primary Examiner*—Eugene R. LaRoche
*Assistant Examiner*—Tan Nguyen
*Attorney, Agent, or Firm*—H. F. Somermeyer

[57] ABSTRACT

A magnetooptic disk has circumferentially-spaced-apart, radially-aligned embossed sector areas which indicate data storage tracks. The sector areas include embossed signals which indicate track following information, and in a second area which trails the track-following information, track-seeking information is carried by the embossed signals. A magnetooptic coating covers the entire disk including the embossed sector areas. Readback clock synchronization signals are recorded over the track seeking area to enable synchronizing a readback phase locked loop such that more of the areas between adjacent sector areas can be used for recording data signals. During track seeking, the track seek controlling embossed signals are read using intensity demodulation, while in track following, during a readback, the clock signals recorded over the embossing are read for synchronizing the readback circuits. During recording, the synchronization signals are recorded over the embossed area dedicated to track seeking.

6 Claims, 1 Drawing Sheet

DATA STORAGE MEMBER HAVING AREAS IN WHICH INTENSITY-MODULATED SIGNALS ARE OVERLAID WITH MAGNETO-OPTICALLY RECORDED SIGNALS

This application is a continuation of application Ser. No. 07/707,215, filed on May 24, 1991, abandoned which is a continuation of Ser. No. 449,260 filed on Dec. 11, 1989 now U.S. Pat. No. 5,050,144 entitled "A DATA STORAGE MEMBER HAVING AREAS IN WHICH INTENSITY-MODULATED SIGNALS ARE OVERLAID WITH MAGNETO-OPTICALLY RECORDED SIGNALS", in the name of T. E. Henderson, et al.

FIELD OF THE INVENTION

The present invention relates to optical disk recorders, and more particularly to those optical disk recorders employing media having magnetooptic coatings, as well as intensity-modulation recorded signals, such as molded or embossed signals, which are represented by recording surface fluctuations

BACKGROUND OF THE INVENTION

Optical disks often employ grooved media for identifying storage track areas at high track densities. Removal of grooves would be a great advantage. Another factor in optical disk is space utilization; i.e., the less area dedicated to controlling the operation of the recorder using the optical storage medium, the more efficient data storage becomes. Accordingly, it is desired to provide multiple uses of the control area dedicated for controlling a recorder utilizing the storage media.

Many optical disks are so-called hard-sectored; i.e., control information is embossed along radial lines for identifying sectors. The sectors, or the spaces between the embossed areas, circumferentially identify the signal storing tracks, there will be a large number of such tracks on each disk surface. In many optical disks, the storage of data signals intensity modulates a reading light beam such that a single detector can detect both the embossed control area and the data area which can be phase-change modulated, color modulated (using dyes), or ablative recording which introduces pits into the area for representing data signals.

Another form of optical recording is the well-known magnetooptic recording. In magnetooptic recording, the recorded information is sensed by measuring the linear polarization rotation of the reading light beam reflected from the magnetooptic disk. Accordingly, two detectors are required. One for reading the control information and another required for reading the data information. Further, the embossed area requires a relatively large portion of the disk, therefore, it is desired to provide multiple usage of the embossed area for reducing the control signal overhead for the magnetooptic disk. Hereinafter, magnetooptic is identified by the abbreviation "MO".

DISCUSSION OF THE PRIOR ART

Bell et al., U.S. Pat. No. 4,669,003; Yamada, U.S. Pat. No. 4,636,885; and Cardot et al., U.S. Pat. No. 4,151,571 all show sector servos in magnetic recording disks which include not only track-following control information but also readback clock synchronization signals. All of the signals on such disks are read using a single magnetic detector, as is known. Kulakowski et al., in U.S. Pat. No. 4,814,903 shows a dual usage of disk sectors for track-jumping areas, as well as providing spare sectors on an optical storage medium. The usage of the sectors is either exclusively for storing data as a spare sector or for track jumping.

Co-pending, commonly-assigned application for patent by Tayefeh Ser. No. 07/448,550, filed Dec. 11, 1989 shows a detector usable to detect both MO signals and intensity modulated signals. This showing provides an efficient way of reading both MO modulated signals and intensity modulated signals; no limitation to using a signal detector for reading both signals is intended with respect to the practice of the present invention.

SUMMARY OF THE INVENTION

It is an object of the invention to provide an enhanced MO storage member, which is hard-sectored, for enabling recording magnetooptic signals over embossed areas and for selectively reading either the embossed areas as intensity signals or reading the MO signals.

An apparatus for reading signals from a magnetooptic disk, which has embossed areas on a disk, coated by MO recording materials, readback means that provide for sensing the signals recorded on the disk in either the intensity modulated means, such as represented by the embossed sector marks, or by sensing the magnetooptic signal recorded all over the embossed areas.

The foregoing and other objects, features and advantages of the invention will be apparent from the following more particular description of preferred embodiments of the invention, as illustrated in the accompanying drawings.

DETAILED DESCRIPTION

Referring now more particularly to the appended drawing, like numerals indicate like parts in the two figures.

Figure 1:
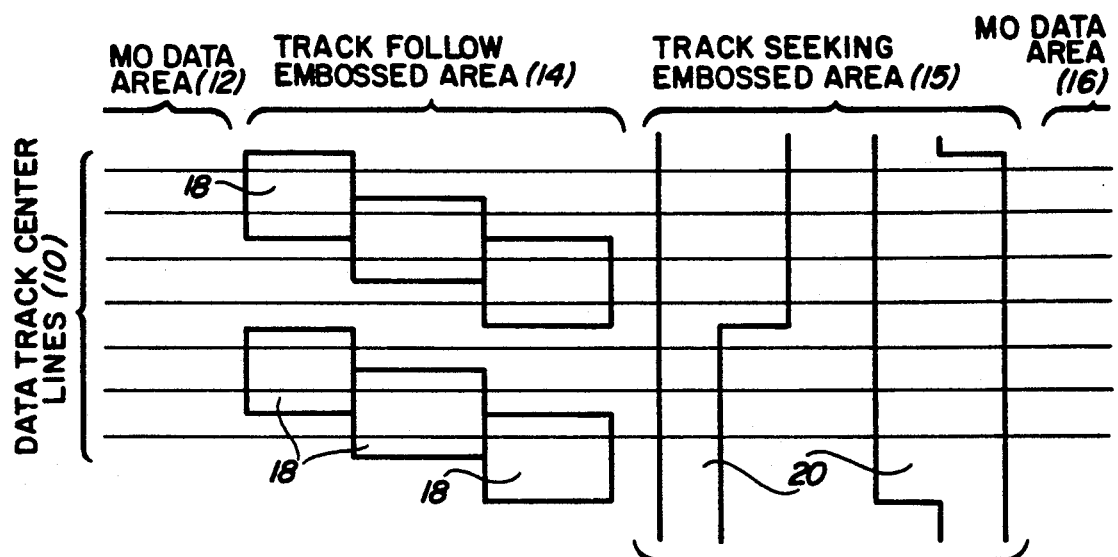
FIG. 1 diagrammatically shows an embossed area with magnetooptic coating thereon for recording both intensity modulated signals and magnetooptic recorded signals.

An MO disk 30, rotatable on shaft 31, is a hard-sectored disk such as shown in FIG. 1. The hard-sectoring includes embossed areas 14 and 15, which are circumferentially interposed on a plurality of data tracks represented by center lines 10 of areas 12 and 16. The track-following embossed area 14 includes a plurality of embossed portions 18 arranged to enable identification of the track center lines 10 as a light beam is scanning any one of the tracks represented by center lines 10. Operation of such track following is well known and not further described for that reason. Additionally, area 15 is provided for enabling enhanced track seeking by providing embossed portions 20 which are preferably Gray code modulated in circumferential width along the radial direction. Such Gray code encoding is known and its application to track seeking for identifying radial position during a track seek is well known. Because of the relatively low frequency of change in the radial direction of the Gray coded portions 20, relatively reliable radial positioning control can be achieved even during rapid track-seeking motions. In addition to areas 14 and 15 in the hard-sectored areas, a track address and sector address may also be employed. If the track-seeking embossed area 15 is dispensed with, then such addresses can be inserted in place of the track-seeking area 15.

The signals recorded on MO disk 30, whether embossed for intensity modulating a read beam, or MO recorded for linear polarization rotating a read beam, is sensed by a magnetooptic system 32 of known design via a dual direction light path 33, as is known. Magnetooptic system 32 includes a laser for supplying a read or write beam over path 32. The supplied beams are reflected by the surface of MO disk 30 back into the magnetooptic system 32. The read beams are processed optically (as known) to provide a p-component signal over a light beam path 34 and an s-component optical signal over light path 35. Also included in magnetooptic system 32 are the usual focusing systems and track-following and track-seeking systems.

Figure 2:
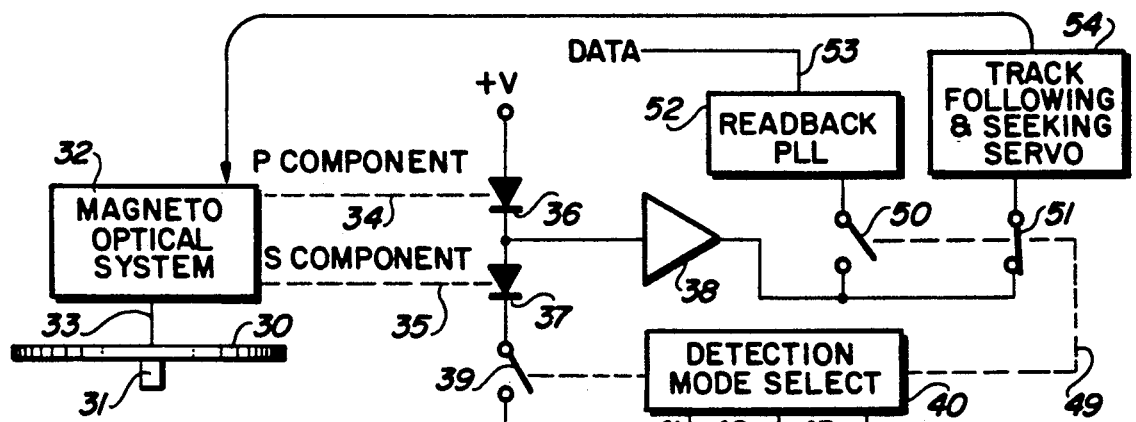
FIG. 2 is a simplified schematic diagram showing readback of signals from an embossed area of either the intensity modulated signals or the MO modulated signals.

Cascode connected diodes 36, 37 extend between a +V voltage supply and a ground reference potential respectively receive the p- and s-component optical signals for generating an electrical signal therefrom. Operational amplifier 38 has its input connected to the common connection between diodes 36 and 37 for supplying a differential signal through the closed switch 50 to readback PLL 52 for supplying data signals over line 53. This arrangement is a data readback detection system for magnetooptically modulated signals. Switch 50 is preferably closed only when data signals are to be read. The photodiodes 36 and 37 are oriented in the same direction, as indicated in FIG. 2.

To switch between detecting intensity modulated signals and magnetooptically modulated signals, electronic switch 39 is interposed between the cathode of photodiode 37 and ground reference potential. Detection mode select circuit 40 selectively opens and closes electronic switch 39. When electronic switch 39 is closed, magnetooptic modulated signals are detected by readback PLL (phase-lock loop) 52. Accordingly, detection mode select circuit 40, as indicated by dashed line 49, synchronously closes switch 50 with the closing of switch 39.

When switch 39 is opened, then photodiode 37 is effectively taken out of the circuit; photodiode 36 becomes the sole detector which is an intensity-modulation light detector. Intensity-modulated detected signals, as supplied through operational amplifier 38, through the now closed switch 51, and to servo circuits 54. Servo circuits 54 supply servo control signal to magnetooptical system 32 for controlling the track following and track seeking servo, as is known. Switches 50 and 51 are alternately closed or opened by detection mode select circuit 40. The opening and closing of switches 39, 50 and 51 are synchronized to the rotational position of optical or MO disk 30. Such controls are well known, and additionally are shown by Kulakowski et al. in U.S. Pat. No. 4,814,903, which is incorporated herein by reference. This patent is also cited as prior art in the discussion of the prior art. A focus servo, not shown, is also employed in an optical system.

Mode of circuit 40 is controlled by a control means, such as shown by Kulakowski et al., and not detailed herein. When the optical recorder represented in the drawing is in a track-following mode, then a positive of signal is supplied over line 41 for indicating track track following. In this mode, the track-follow embossed area 14 is sensed as for intensity modulated signals; i.e., embossment portions 18 are sensed using switch 39 open. Upon reaching the track-seeking embossed area 15, rather than reading the embossed portions 20, any magnetooptic recorded signals in embossed area 15 are read by closing switch 39. The intensity modulation of the reflected light beam is eliminated by the differential detection of the p and s components as described above. Any constructed embodiment of the present invention synchronizes readback PLL 52 to the movement of storage member or disk 30 at record and track-seeking embossed area 15. Upon exiting the area 15, the readback PLL 52 has been phase and frequency synchronized and MO data area 16 is immediately available for reading the recorded information. In the prior art, such PLL synchronization signals were recorded in the MO data area 16. By moving the PLL synchronization signals to area 15, an increase of several percentage points for data storage is provided to the optical storage member. As areal densities increase, this percentage increase of storage area represents substantial increases in the amount of information storable on a single storage member.

In a track-seeking mode, the controller (not shown) provides a track-seek signal over line 42 causing the detection mode select circuit to keep switch 39 open while scanning the track-seeking embossed area 15. In a track seek operation, no other signals need be sensed. When the optical recorder is to record information onto storage member 30 or to erase recorded signals from storage member 30, the control signal is supplied over line 43 to actuate detection mode select circuit 40 for disabling readback PLL 52 at all times, and enable and close switch 51, while opening switch 39, when reading the track-follow embossed area 14. When recording data signals, the PLL synchronization signals are recorded in track-seeking embossed area 15, followed by recording the data signals in MO data area 16. During erasing, the MO data area 16 may only be erased or alternately the track-seeking embossed area 15 may also be erased for erasing the MO storage signals.

It is also possible to simultaneously read embossed signals recorded in area 15; i.e., sector ID and track ID while reading MO signals. In this case, both switches 50 and 51 are closed such that the MO modulated signals are detected by readback PLL 52 and the intensity modulation signals would necessarily be provided through a separate detector in magnetooptic system 32 and supplied through closed switch 51 to servo circuits 54. In this instance, two separate optical detectors are required. One for the magnetooptic modulation and the other for the intensity modulation detection. These circuits are not shown because they are so well known.

Figure 3:
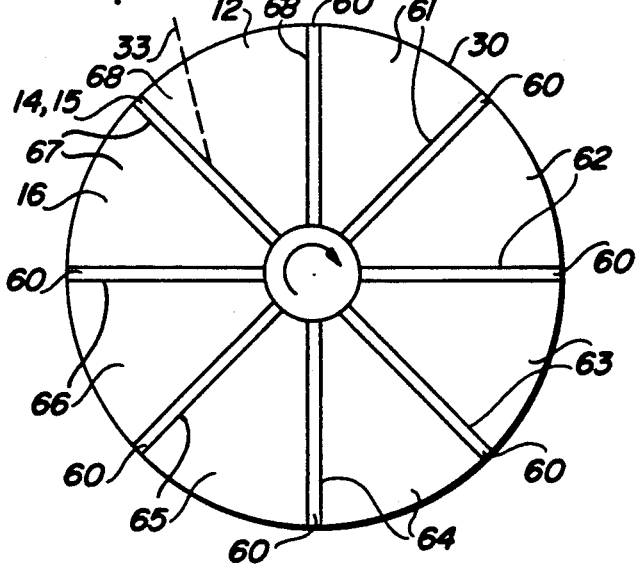
FIG. 3 is a plan view diagrammatically showing a magnetooptic disk using the present invention.

As seen in FIG. 3, disk 30 is circumferentially divided into a plurality of radially-extending sectors 61-68, inclusive. Sector 68 has MO area 12 while sector 67 has MO data area 16. Each signal storing sector 61-68 has a sector portion 60 consisting of embossed areas 14, 15 (disk 30 is rotating in direction of arrow). Each leading embossed sector portion 60 has one set of embossed areas 14, 15. The difference between the leading sector portions 60 in the respective signal storing sectors 61-68 is the information represented by the embossing.

While the invention has been particularly shown and described with reference to preferred embodiments thereof, it will be understood by those skilled in the art that various changes in form and details may be made therein without departing from the spirit and scope of the invention.

What is claimed is:

1. A magnetooptic disk having a magnetooptic recording surface having a plurality of radially-extending, circumferentially-adjacent signal storing sectors, the sectors being identified by a sector portion disposed at one circumferential end-portion of each sector, respectively, a remaining portion of each of said respective sectors for magnetically storing signals, each said sector portion having embossed machine-sensible indicia for indicating a circumferential boundary of each respective sector, for identifying each respective sector and a Gray-coded area in each of the sector portions for indicating predetermined control signals; and said embossed Gray-coded areas in the respective sectors abutting said remaining portions, respectively, and one of said embossed Gray-coded areas including magnetically recorded data synchronizing signals for enabling magnetooptically reading magnetically recorded data signals recorded in said remaining portions of the respective sectors.

2. The disk set forth in claims 1 wherein the disk is to be used in an optical disk device having track-seeking and track-following operations to be performed with respect to the disk, further including in combination;

the embossed machine-sensible indicia in each of the Grey-coded areas respectively indicating track-seeking control information for use during said track seeking operations and said magnetically recorded synchronizing signals for use during track-following operations for indicating data-clock synchronization for enabling magnetooptically reading magnetically recorded signals for use during said track following operations.

3. The disk set forth in claim 2, further including, in combination:

a predetermined section of said embossed machine-sensible indicia in each of said sector portions indicating information-bearing track center-lines for enabling said track following operations.

4. A magnetooptic storage member having a magnetooptic recording layer having a data portion for magnetically storing first information-bearing signals in a multiplicity of addressable signal storing sectors;

a predetermined area of each of said sectors having embossed machine-sensible indicia for indicating second information-bearing signals, said magnetooptic recording layer having a given portion disposed on and conforming to a surface shape of said machine-sensible indicia such that said given portion has an outwardly facing surface that is a replica of said embossed machine-sensible indicia; and a predetermined portion of said first information-bearing signals in each of said sectors being magnetically recorded in respective ones of said given portions such that said predetermined portions of the first information-bearing signals are recorded over said embossed machine-sensible indicia in said respective given portions.

5. In the storage member set forth in claim 4, further including, in combination:

said second information-bearing signals indicating positional information for identifying said addressable signal storing sectors, respectively, for enabling addressably accessing said signal storing sectors; and said predetermined portion of said first information bearing signals indicating timing information for enabling reading respective adjacent ones of said magnetically recorded first information bearing signals.

6. In the storage member set forth in claim 5, further including, in combination:

a second predetermined portion of said second information bearing signals respectively indicating track scanning alignments of said signal storing sectors such that all of the signal storing sectors are circumferentially aligned whereby a plurality of signal storing tracks are identified on the storage member.

* * * * *